US007035586B2

(12) United States Patent
Finet

(10) Patent No.: US 7,035,586 B2
(45) Date of Patent: Apr. 25, 2006

(54) WIRELESS INTERCONNECTION METHOD AND ASSEMBLY FOR ESTABLISHING A BIDIRECTIONAL COMMUNICATION BETWEEN AUDIO AND/OR VIDEO DEVICES

(75) Inventor: Bernard Finet, Sotteville les Rouen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 569 days.

(21) Appl. No.: 10/122,746

(22) Filed: Apr. 15, 2002

(65) Prior Publication Data

US 2002/0168934 A1 Nov. 14, 2002

(30) Foreign Application Priority Data

Apr. 18, 2001 (FR) .................................. 01 05260

(51) Int. Cl.
*H04B 3/36* (2006.01)

(52) U.S. Cl. .............................. 455/7; 725/78; 725/81

(58) Field of Classification Search .................... 455/7, 455/3.03, 3.01, 3.06, 419, 352; 348/734, 348/14.05, 114, 211.1, 211.2, 211.3, 211.99; 725/78, 80, 81, 82, 83, 85; 340/426.13, 426.14, 340/426.15, 426.17, 426.16

See application file for complete search history.

(56) References Cited

U.S. PATENT DOCUMENTS 5,712,638 A * 1/1998 Issa ............................ 341/176
6,025,785 A * 2/2000 Farris et al. ............... 340/5.23
6,263,503 B1 * 7/2001 Margulis ...................... 725/81
6,400,968 B1 * 6/2002 White et al. ................ 455/572
6,567,984 B1 * 5/2003 Allport ........................ 725/110
6,598,202 B1 * 7/2003 Kim et al. .................. 714/786

* cited by examiner

*Primary Examiner*—Nay Maung
*Assistant Examiner*—Raymond S. Dean
(74) *Attorney, Agent, or Firm*—Edward W. Goodman

(57) ABSTRACT

In a interconnection assembly having two relays (R1, R2) for establishing a bi-directional wireless communication between two audio and/or video devices (4, 8) situated in different rooms (2, 3) in a building (1), a first one (4) of the two audio and/or video devices including a source (SAV) of audio and/or video electrical signals which can be controlled by means of a remote-control signal (6), the second (8) of the two audio and/or video devices including a receiver (TV2) and a remote control (TC) generating remote-control signals unable to pass through the walls of a building, one (R2) of the relays sending the remote-control information by radio link to the other relay (R1) which is able to return audio and/or video signals by radio link from the source (SAV) to the relay (R2), a coder (13) is provided for inserting a code in the remote-control information (9) and a decoder is provided (18) for decoding the coded remote-control information received by the relay (R1), comparing the code contained in the coded remote-control information with a reference code, and rejecting the decoded remote-control information in the event of non-agreement between the two codes.

11 Claims, 3 Drawing Sheets

WIRELESS INTERCONNECTION METHOD AND ASSEMBLY FOR ESTABLISHING A BIDIRECTIONAL COMMUNICATION BETWEEN AUDIO AND/OR VIDEO DEVICES

BACKGROUND OF THE INVENTION

1. Field of the Invention

The present invention relates to a wireless interconnection method for establishing a bi-directional communication between two audio and/or video devices situated in different rooms of a building, and a wireless interconnection assembly for implementing this method.

A user frequently has several audio and/or video devices installed in different rooms in his dwelling, for example, a main audio and/or video device installed in the living room and a secondary audio and/or video device installed in another room, for example, in the bedroom. The main audio and/or video device can have a first receiver, such as, for example, a television receiver, and at least one source of audio and/or video electrical signals, such as, for example, a cable television channel decoder, a satellite television decoder, a pay TV decoder, a videotape recorder, a digital video disk (DVD) player, a hi-fi unit, an audio cassette player, a compact disk player, etc. The secondary audio and/or video device may include a second receiver, such as, for example, a television receiver. The user also frequently has available at least one remote control for controlling the appliance or appliances of the main audio and/or video device and of the secondary audio and/or video device at a distance, for example, a remote control specific to each appliance or a multifunction or universal remote control, that is, one able to control several appliances.

2. Description of the Related Art

It is well known that the control signals emitted by some remote controls, such as, for example, infrared remote controls, cannot pass through the walls or partitions separating the rooms in a building or dwelling. This is why wireless interconnection assemblies have already been proposed, able to establish a bi-directional communication between two audio and/or video devices situated in different rooms, and enabling a user situated in the room where the secondary audio and/or video device is installed to control the audio and/or video signal source or sources installed in the room where the main audio and/or video device is situated, by means of a remote control generating remote-control signals unable to pass through the walls or partitions of the building. Thus, the user can listen to and/or display, on the receiver of the secondary audio and/or video device, an audio and/or video program transmitted by the audio and/or video signal source of the main audio and/or video device. To this end, the known wireless interconnection assemblies are composed essentially of two transmission relays which are disposed, respectively, at the main audio and/or video device and at the secondary audio and/or video device. The two transmission relays are hybrid relays, that is, each relay is capable of receiving or sending a remote-control signal, and the two relays communicate with each other by radio links. One of the radio links, for example, at 2.46 GHz, is usually dedicated to the transmission of audio and/or video signals from the relay situated at the main audio and/or video device to the relay situated at the secondary audio and/or video device. Another radio link, for example, at 433 or 868 MHz, is usually dedicated to the transmission of remote-control information from the relay situated at the secondary audio and/or video device to the relay situated at the main audio and/or video device.

The problem is that when two identical wireless interconnection assemblies are close to each other, these interconnection assemblies can interfere with each other. This may, for example, be the case when two users living in adjacent houses or apartments have such interconnection assemblies. With regard to the transmission of the audio and/or video signals, this problem is resolved by the fact that the two relays of the interconnection assembly are usually designed so as to offer to the user several channels for the radio link by means of which the audio and/or video signals pass. If the transmission is poor on the channel, the user can then choose another channel. This solution is not applicable to the radio link by means of which the remote-control information passes, since there is usually only one channel available.

SUMMARY OF THE INVENTION

An object of the present invention is, therefore, to resolve this problem by providing a wireless interconnection method and assembly for avoiding interference by remote-control information originating in a remote control foreign to said wireless interconnection assembly.

To this end, the object of the invention is an interconnection method for establishing a bi-directional communication between two audio and/or video devices situated in different rooms in a building, a first of the two audio and/or video devices including a source of audio and/or video electrical signals which can be controlled by a remote-control signal, the second of the two audio and/or video devices comprising a receiver and a remote control of the type generating a remote-control signal unable to pass through the walls or partitions of a building, said method consisting of:

a) on the second audio and/or video device side, picking up a remote-control signal emitted by the remote control and, by radio link, retransmitting remote-control information contained in the remote-control signal picked up;

b) on the first audio and/or video device side, receiving the remote-control information retransmitted by radio link, resending said remote-control information in the form of said remote-control signal to the audio and/or video signal source in order to control the functioning of the latter, and sending, by radio link, audio and/or video signals delivered by said audio and/or video signal source in response to the remote-control signal;

c) on the second audio and/or video device side, receiving the audio and/or video signals sent by radio link and delivering said audio and/or video signals thus received to the receiver of the second audio and/or video device;

characterized in that it also consists of:

d) on the second audio and/or video device side, inserting a code in the remote-control information sent by the remote control, so as to transmit coded remote-control information to the first audio and/or video device;

e) on the first audio and/or video device side, decoding the coded remote-control information received, comparing the code contained in the coded remote-control information received with a reference code and rejecting the decoded remote-control information in the event of non-agreement between the two codes.

The method according to the invention can also include one or more of the following characteristics:

f) the remote-control information sent by the remote control consists of an information bit frame and the coding is effected by replacing the start of each information bit in the frame by a code word composed of several code bits having in total a duration shorter than that of an information bit of the frame;

g) use is made, as the code word for the coding of the second audio and/or video device side, and as a reference code word for comparing the first audio and/or video device side, a code word composed of a fixed part having at least one code bit, which forms the first bit of the code word and which has the binary value "1" in order to serve as a synchronization bit during the step of decoding the first audio and/or video device side, and a part whose code bits have values which can be selected by a user;

h) in one embodiment of the method according to the invention, in the event of non-agreement between the two codes, the step of rejecting the decoded remote-control information consists of sending a remote-control signal whose content is incomprehensible to the audio and/or video signal source;

i) in another embodiment of the method according to the invention, in the event of non-agreement between the two codes, the step of rejecting the decoded remote-control information consists of sending no remote-control signal to the audio and/or video signal source.

Another object of the invention is a wireless interconnection assembly for establishing a bi-directional communication between two audio and/or video devices situated in different rooms in a building, a first of the two audio and/or video devices including an audio and/or video electrical signal source which can be controlled by a remote-control signal, the second of the two audio and/or video devices comprising a receiver and a remote control of a type generating a remote-control signal unable to pass through the walls or partitions of a building, said interconnection assembly comprising a first and second relay able to be connected by cables respectively to the audio and/or video signal source of the first audio and/or video device and to the receiver of the second audio and/or video device, the second relay having a first receiving means for receiving remote-control information issuing from the remote control and a first sending means for retransmitting said remote-control information by radio link to the first relay, which has a second receiving means for receiving the remote-control information retransmitted by the second relay, a second sending means for sending said remote-control information in the form of said remote-control signal to the audio and/or video signal source in order to control the functioning of the latter, and a third sending means for sending, by radio link, audio and/or video signals delivered by the audio and/or video signal source in response to the remote-control signal, the second relay also having a third receiving means for receiving the audio and/or video signals sent by the third sending means of the first relay and sending them by the corresponding cable to the receiver of the second audio and/or video device, characterized in that said interconnection assembly also has, on the second audio and/or video device side, a coder for inserting a code in the remote-control information and, on the first audio and/or video device side, a decoder for decoding the coded remote-control information received, comparing the code contained in the coded remote-control information received with a reference code stored in the decoder, and rejecting the decoded remote-control information in the event of non-agreement between the two codes.

The interconnection assembly according to the invention can also have one or more of the following characteristics:

the coder is disposed in the second relay between the first receiving means and the first sending means, and the decoder is disposed in the first relay between the second receiving means and the second sending means;

the remote-control information consists of an information bit frame, and the coder has a first code memory containing a code word composed of several code bits having together a duration shorter than that of any information bit in said frame, and means for inserting said code word at the start of each information bit in the information bit frame coming from the first receiving means and for delivering a coded frame to the first sending means;

the code word is composed of two parts, namely a fixed part having at least one code bit, which forms the first bit of the code word and which has the binary value "1" in order to serve as a synchronization bit during the decoding in the decoder, and a part whose code bits have values which can be selected by a user;

the decoder has a second code memory containing a reference code word identical to the code word contained in the first code memory of the coder, a monostable circuit which is triggered in response to the arrival of each information bit of the coded frame and which delivers a pulse having a duration longer than that of any information bit in said coded frame, comparison and decoding means which, in response to the pulse delivered by the monostable circuit, compare the code word carried by the information bit which triggered the monostable circuit with the reference code word contained in the second code memory and which, in the case of agreement between the two code words, allow the information bit to pass, in decoded form, to the second sending means and deliver a reset pulse at the end of said information bit in order to reset said monostable circuit and to cause it to await the following information bit in the coded frame, and which, in the case of non-agreement between the two code words, deliver at least one reset pulse before the end of the information bit;

the second sending means includes an infrared light emitter, an electronic switch which connects one of the terminals of the infrared light emitter to a reference potential point and which is controlled by the decoded information bits coming from the decoder, an oscillator for generating a modulation carrier which is applied to another terminal of the infrared light emitter, and a shaping monostable circuit, which is triggered by each reset pulse delivered by the comparison and decoding means of the decoder and which controls said oscillator.

Another object of the invention is a remote-control signal, comprising an information bit frame for controlling a function in an audio and/or video signal source, characterized in that it contains a code word for identifying the remote control from where the remote-control signal came.

BRIEF DESCRIPTION OF THE DRAWINGS

The invention will be further described with reference to examples of embodiments shown in the drawings to which, however, the invention is not restricted.

DESCRIPTION OF THE PREFERRED EMBODIMENTS

Figure 1:
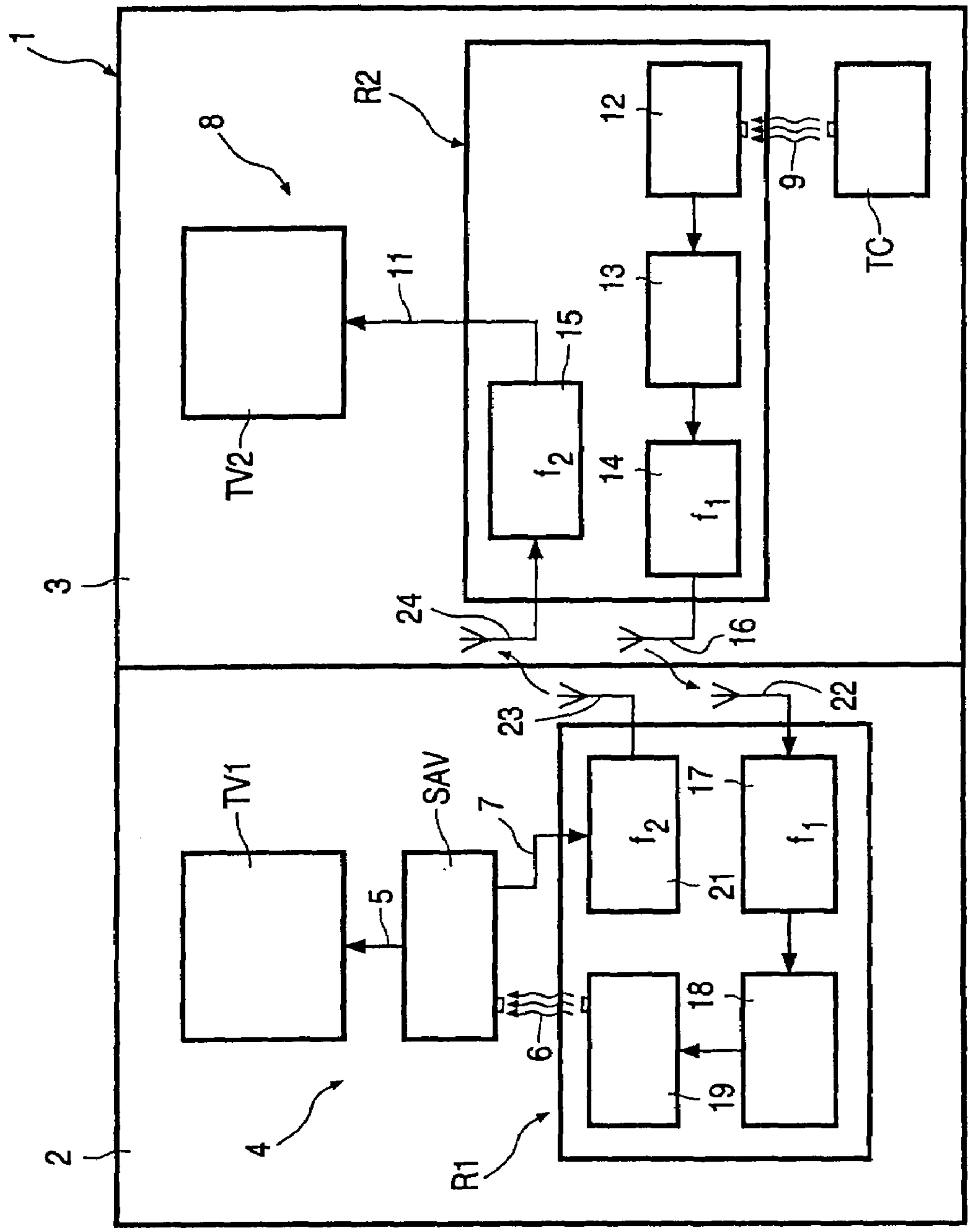
FIG. 1 shows, schematically, a wireless interconnection assembly according to the invention for two audio and/or video devices installed in different rooms in a building.

Referring first of all to FIG. 1, a part 1 of a building can be seen, such as a part of an individual house or a part of an apartment in a building, having two rooms, for example, a living room 2 and a bedroom 3.

In the living room 2, a first audio and/or video device 4 is installed, comprising a first receiver, such as a television receiver TV1, and at least one audio and/or video signal source SAV, which is connected to the television receiver TV1 by a cable 5 and which can be controlled by an infrared control signal 6. The source SAV can, for example, consist of a cable television decoder, a satellite television decoder, a pay TV decoder, a video tape recorder, a DVD player, etc. In the living room 2, a first relay R1 is installed, this first relay R1 being connected by a cable to the source SAV and which will be described in detail below.

Figure 3:
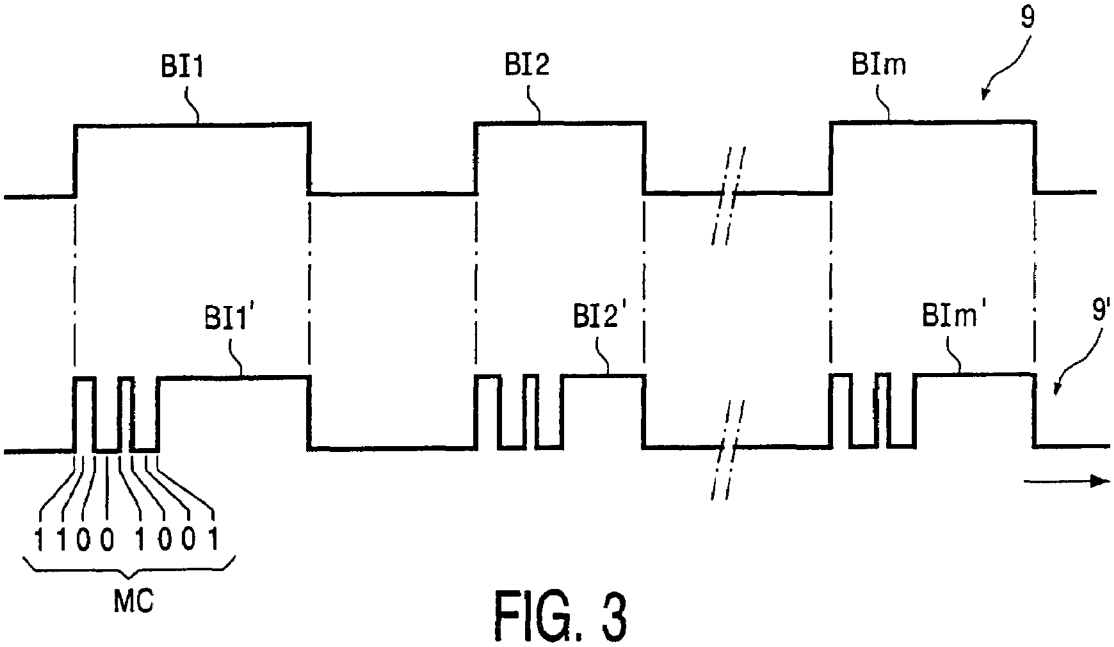
FIG. 3 shows a conventional remote-control signal and a coded remote-control signal according to the invention.

In the bedroom 3, a second audio and/or video device 8 is installed, comprising a second receiver, such as a television receiver TV2, and an infrared remote control TC which can be actuated by a user in order to send infrared remote-control signals 9 for controlling functions in the source SAV and possibly also functions in the television receiver TV2. A conventional remote-control signal 9 is shown in the upper part of FIG. 3. The remote-control signal 9 consists of a carrier (not shown) carrying remote-control information consisting of a frame of information bits BI1, BI2 . . . BIm of variable width.

Returning to FIG. 1, it can be seen that a second transmission relay R2 is installed in the bedroom 3 and is connected by a cable 11 to the television receiver TV2. The relay R2 essentially includes an infrared receiving cell 12, a coder 13, a sender 14 working at a first frequency f1, for example, 433 or 868 MHz, and a receiver 15 working at a second frequency f2, larger than f1, for example, 2.46 GHz.

When the remote control TC is actuated by a user, the receiving cell 12 picks up the remote-control signal 9 emitted by the remote control TC and modulated by remote-control information, demodulates the signal 9 and sends, to the coder 13, the remote-control information contained in the signal 9. The coder 13 inserts a code in the remote-control information and sends the remote-control information thus coded to the sender 14, which uses the coded remote-control information to modulate a carrier at the frequency f1 and, via an antenna 16, to resend the coded remote-control information to the relay R1 installed in the living room 2.

The relay R1 comprises essentially a receiver 17 working at the frequency f1, a decoder 18, an infrared sending cell 19 and a sender 21 which is connected by the cable 7 to the source SAV and which works at the frequency f2. The signal sent by the antenna 16 of the relay R2 and modulated by the coded remote-control information is picked up by an antenna 22 of the relay R1 and applied to the receiver 17, which demodulates the received signal and sends, to the decoder 18, the coded remote-control information contained in the received signal. The decoder 18 decodes the coded remote-control information and compares the code contained in said remote-control information with a reference code stored in the decoder 18. In the event of non-agreement between the two codes, the decoder 18 rejects the remote-control information. On the other hand, in the event of agreement between the two codes, the decoder 18 sends the decoded remote-control information to the sending cell 19, which then sends the infrared control signal 6 to the source SAV. In response to the infrared control signal 16, the source SAV sends audio and/or video signals, via the cable 7, to the sender 21 of the relay R1. The sender 21 uses the audio and/or video signals received from the source SAV to modulate a carrier at the frequency f2, in order to retransmit said audio and/or video signals, via an antenna 23, to the relay R2.

The carrier modulated by the audio and/or video signals and sent by the antenna 23 is picked up by an antenna 24 of the relay R2 and applied to the receiver 15, which demodulates said carrier and sends the audio and/or video signals, via the cable 11, to the television receiver TV2.

Thus, with the interconnection assembly according to the invention, a user situated in the bedroom 3 can control the source SAV situated in the living room 2 by means of the remote control TC and display a television program on the television receiver TV2. There is no risk of the source SAV being triggered unwantedly or disturbed by a remote-control signal coming from an infrared remote control situated in an adjacent house or apartment and associated with another interconnection assembly similar to the one formed by the relays R1 and R2, but using no code or using a different code.

Figure 2:
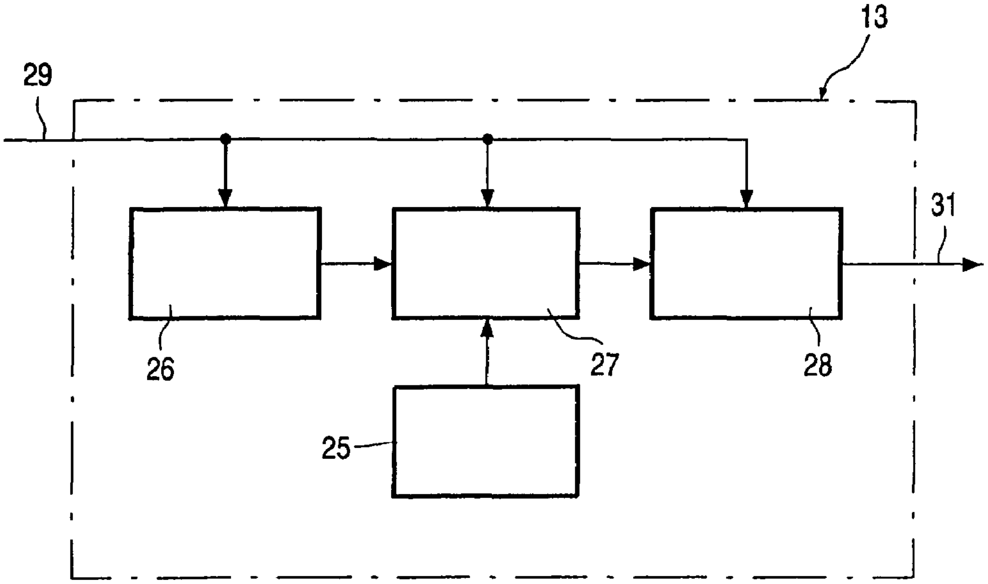
FIG. 2 shows, schematically, a coder forming part of a transmission relay installed in one of the two rooms in the building in FIG. 1.

Referring to FIG. 2, an embodiment of the coder 13 of the relay R2 can be seen. The coder 13 essentially has a code memory 25, a clock 26, a shift register 27 and a coupler 28. At its input 29, the coder 13 receives the signal sent by the remote control TC and demodulated by the infrared receiving cell 12. As indicated above, this signal usually consists of a frame or chain of information bits of variable width, such as the frame 9 shown in the upper part of FIG. 3. The input 29 of the coder 13 is connected to the clock 26, to a loading/unblocking input of the shift register 27 and to one of the inputs of the coupler 28, consisting for example of a gate circuit, the other input of which is connected to the output of the shift register. The latter is initially loaded with a code word contained in the code memory 25, when its loading/unblocking input is in a low state. The code word can, for example, be an 8-bit word. Preferably, the 8-bit code word has a fixed part having, for example, 4 code bits to the format "0-1-0-1" and a variable part having 4 code bits whose binary values can be selected by the user, which offers 16 possible values for the code word. The code bits of the variable part can be interleaved with the code bits of the fixed part of the code word, or combined with the code bits of the fixed part in any other way. However, in all cases, it is preferable for the last code bit, with a binary value "1", of the fixed part of the code word to be stored in the 8th bit position of the shift register 27, that is, in the position of the bit which will emerge first from the shift register, so that this code bit of value "1" forms the first bit of the code word and can thus then serve as a synchronization bit in the decoder 18.

With the format of the code word described above, the code memory 25 has a coding wheel or 4 micro-switches for selecting the binary values of the 4 code bits of the variable part of the code word. Naturally, the variable part of the code word can have a larger number of code bits than the fixed part of the code word if it is desired to have more than 16 possible values for said code word. For example, a code word having a fixed part of 3 code bits and a variable part of 5 code bits will offer 32 possible values for the code word.

The functioning of the coder 13 in FIG. 2 will now be described. On the arrival of the first information bit BI1 of the frame 9 at the input 29 of the coder 13, the clock 26 is started and simultaneously the shift register 27 is unblocked. Next, at each clock pulse, the shift register 27 is shifted by one bit position, so that it successively delivers, at its output, the bits of the code word, commencing with the bit of binary value "1" of the fixed part of the code word. The frequency of the clock pulses emitted by the clock 26 is chosen so that the code bits delivered at the output of the shift register 27 have, in total, a shorter duration than that of the shortest information bit BI liable to be received by the coder 13. Thus, the code bits of the code word sent by the shift register 27 to the coupler 28 (the gate circuit) are inserted by the latter at the start of the information bit BI1. At the 8th clock pulse, the clock 26 stops, the shift register 27 is blocked and the output 31 of the gate circuit 28 remains at the high level until the end of the information bit BI1. The cycle described above is reproduced on the arrival of each following information bit BI2 . . . BIm of the information bit frame received at the input 29 of the coder 13. Consequently, the gate circuit 28 delivers at its output 31, which also constitutes the output of the coder 13 and which is connected to the sender 14 (FIG. 1), a frame 9' of coded information bits BI1', BI2', . . . BIm', which has, for example, the form depicted in the lower part of FIG. 3. In the example depicted in FIG. 3, the code word MC inserted at the start of each coded information bit BI', BI2', . . . BIm', has the format "11001001". The code bits of the variable part of the code word MC here respectively have the values "1", "0", "0" and "1" and are interleaved between the code bits "1", "0", "1" and "0" of the fixed part of the code word.

After modulation, the coded information bit frame 9' is retransmitted by radio link by the sender 14 of the relay R2 to the receiver 17 of the relay R1. After demodulation by the receiver 17, the coded information bit frame 9' is sent to the decoder 18.

Figure 4:
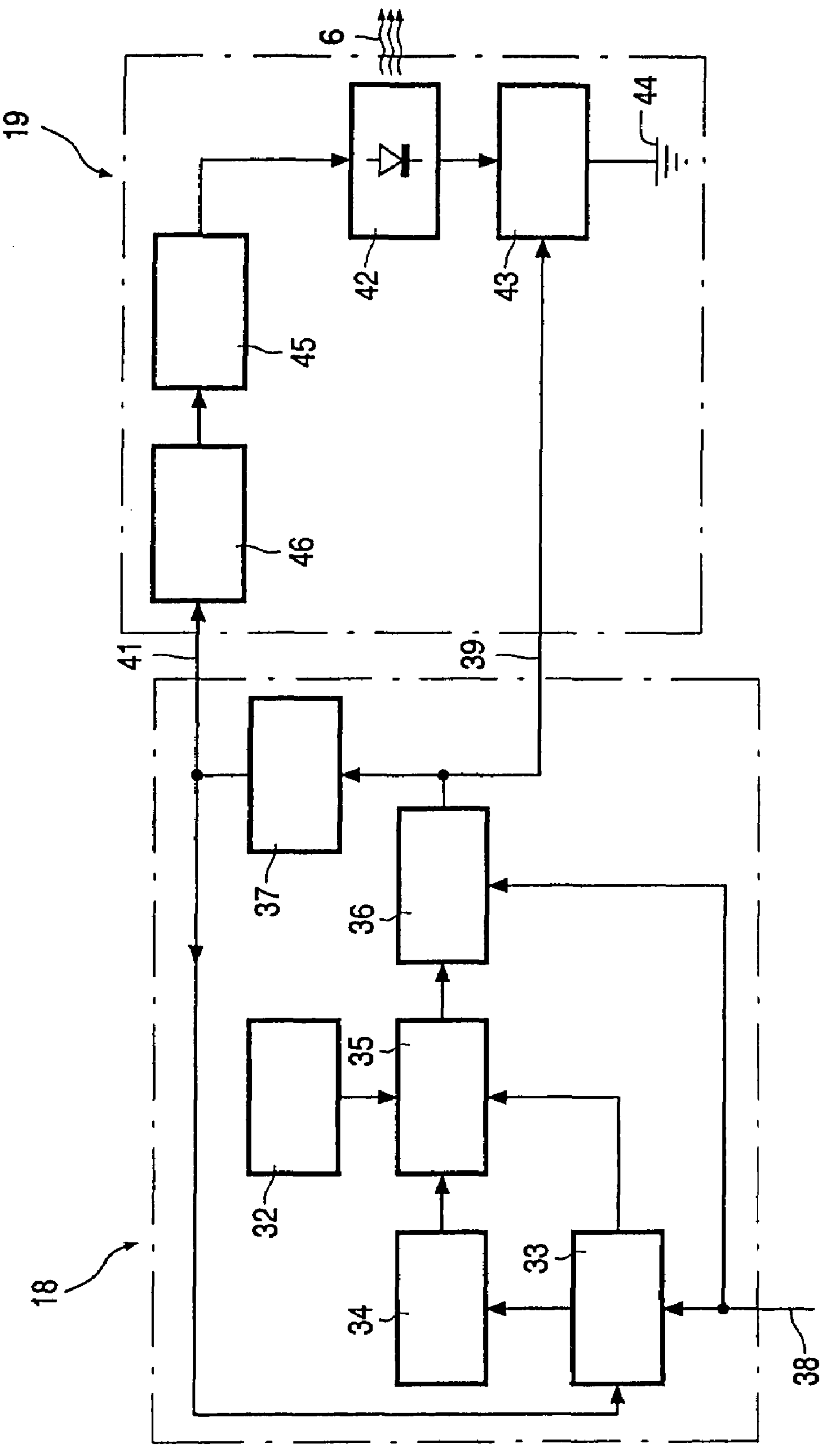
FIG. 4 shows, schematically, a decoder and sender which form part of a transmission relay installed in the other room in the building in FIG. 1.

Referring now to FIG. 4, an embodiment of the decoder 18 and of the infrared sending cell 19 can be seen. The decoder 18 includes essentially a code memory 32, a monostable circuit 33, a clock 34, a shift register 35, a comparator 36 and a reset circuit 37. The input 38 of the decoder 18, which receives the coded information bit frame 9' coming from the receiver 17, is connected, on the one hand, to the input of the monostable circuit 33 and, on the other hand, to one of the inputs of the comparator 36. An output of the monostable circuit 33 is connected to the clock 34 and another output of the monostable circuit is connected to the loading/unblocking input of the shift register 35. When this loading/unblocking input is at the low state, the register 35 is loaded with a reference code word which is contained in the code memory 32 and which is identical to the code word contained in the code memory 25 of the coder 13 in FIG. 2 (the memory 32 can have a structure identical to that of the memory 25). When the said loading/unblocking input is at the high state, the shift register 35 is unblocked. The output of the clock 34 is connected to the clock input of the shift register 35, the output of which is connected to the other input of the comparator 36. The output of the comparator 36 is connected, on the one hand, to a first output 39 of the decoder 38 and, on the other hand, to the input of a reset circuit 37, the output of which is connected, on the one hand, to a second output 41 of the decoder 18 and, on the other hand, to a reset input of the monostable circuit 33.

The infrared sending cell 19 includes essentially an infrared light emitter 42, an electronic switch 43, an oscillator 45 and a monostable circuit 46. The light emitter 42 consists, for example, of an infrared light-emitting diode, one of whose terminals, for example, the cathode, is connected by the electronic switch 43 to a reference potential point 44, for example, ground. The input of the control of the electronic switch 43 is connected to the output 39 of the decoder 18. The other output 41 of the decoder 18 is connected to the input of the monostable circuit 46, the output of which controls the oscillator 45 which generates a carrier, for example, at 36 kHz, which is applied to the other terminal, for example, the anode, of the infrared light emitting diode 42.

The decoder 18 and the infrared emitting cell function as follows. On the arrival of the first coded information bit BI1' at the input 38 of the decoder 18, coming from the receiver 17, the first bit, of binary value "1", of the code word MC triggers the monostable circuit 33 for a fairly long period of time (approximately 20 ms) which makes it possible to dispense with the content of this information bit BI1'. The triggering of the monostable circuit 33 causes, on the one hand, the starting of the clock 34 and, on the other hand, the unblocking of the shift register 35. Next, at each clock pulse emitted by the clock 34, the register 35, which was previously loaded with the reference code word contained in the memory 32, is shifted by one bit position and, therefore, delivers the code bits of the reference code word successively at its output. At the 8th clock pulse, the clock 34 is stopped and the register 35 is blocked. The code bits of the reference code word are successively applied to one of the inputs of the comparator 36, consisting, for example, of a gate circuit, the other input of which receives the coded information bit BI1' which contains the code word MC. In the event of agreement between the two code words, the comparator 36 (the gate circuit) allows the information bit BI1' to pass, in decoded form, that is, in the form of an information bit similar to the information bit BI1 of the frame 9 shown in the upper part of FIG. 3, to the output 39 of the decoder 18. The end of this information bit activates the reset circuit 37, which then sends a reset pulse to the monostable circuit 33 in order to set it to wait for the following information bit BI2' coming from the receiver 17. The reset pulse produced by the reset circuit 37 is also sent to the output 41 of the decoder 18. The cycle described above is repeated at each following coded information bit BI2', . . . BIm' received at the input 38 of the decoder 18, so that, in the event of agreement between the code word MC contained in each coded information bit and the reference code word contained in the memory 32, the decoder 18 delivers, at its output 39, an information bit frame corresponding to the frame 9 shown in the upper part of FIG. 3.

On the other hand, if any one of the information bits received at the input 38 of the decoder 18 contains no code word or contains a code word in which at least one code bit has a value which differs from that of the code bit of the same order of the reference code word contained in the memory 32, the comparator 36 then activates, as soon as it receives an erroneous code bit, the reset circuit 37. The latter then resets the monostable circuit 33 before the end of the information bit currently being received, which carries no code word or an erroneous code word. This cycle can be re-triggered several times, at each change in state of the signal received at the input 38 of the decoder 18. The output 39 of the decoder 18 then supplies a random signal which in no way corresponds to the original signal.

In the infrared sending cell 19, the authorization to send is effected by the activation of the electronic switch 43 which is controlled by the decoded information bits present at the output 39 of the decoder 18. The oscillator 45 generates the modulation carrier, for example, at 36 kHz, which is applied to the infrared light emitting diode 42. The monostable circuit 46 is triggered by the reset pulse which is produced by the reset circuit 37 at the end of each decoded information bit and which is present at the output 41 of the decoder 18. In response to each reset pulse, the monostable circuit 46 generates, at its output, a high level which resets and blocks the oscillator 45 for a time corresponding to the time constant of the monostable circuit 46. This time constant is, for example, chosen so as to be approximately equal to one half of the duration of sending of an information bit.

When the information bits received at the input 38 of the decoder 18 contain no code word or contain a code word which does not agree with the reference code word contained in the memory 32, as indicated above, the reset circuit 37 produces a reset signal several times during the period of the information bit which carries no code or an erroneous code word. As a result, the reset circuit 37 regularly retriggers the monostable circuit 46, which has the effect of blocking the oscillator 45 and neutralizing the sending of an infrared signal by the infrared light emitting diode 42. The modulation is, therefore, at least partially eliminated, which makes the infrared signal emitted by the diode 42 incomprehensible to the source SAV to which this signal is sent.

It goes without saying that the embodiment of the invention described above was given by way of a purely indicative and in no way limitative example, and that many modifications can easily be made by an expert without departing from the scope of the invention.

Although, in the example described above, a code word MC is inserted by the coder 13 at the start of each information bit BI of the information bit frame 9 received by the infrared receiving cell 12, which offers great security from the point of view of risks of interference with undesired signals sent by one or more other interconnection assemblies sufficiently close to the interconnection assembly described to interfere with the functioning thereof, it is not absolutely essential for each information bit BI to be coded with the code word. This is because the duration of an information bit frame sent by a remote control is generally relatively short (a maximum of 1 to 2 seconds). The probability of two information bit frames being sent simultaneously by two different remote controls belonging to two different interconnection assemblies and relatively close to each other, or of the two frames overlapping in time, is relatively low. Consequently, the code word could be inserted by the coder only at the start of the information bit frame 9, for example, before the information bit BI1. In this case, the decoder can be arranged so that, on reception of the coded frame, it opens a time window with a duration a little longer than that of the longest information bit frame liable to be sent by the remote control, and so that, if the code word inserted at the start of said frame agrees with the reference code word, it allows the frame to pass to the sender 19, while, if the two codes do not agree, it abbreviates and closes the time window again and does not allow said frame to pass to the sender 19.

In addition, instead of producing the coder 13 and decoder 18 from the discrete elements described above, the functions performed, respectively, by the coder and decoder could be executed, respectively, by two microcontrollers under the control of programs respectively stored in the coder and in the decoder. In this case, it is also possible to use, as a code word for the coding and as a reference code word for the decoding, a predefined code word, in which some of the code bits can be selected by the user. By way of variant, it is also possible to use pseudo-random code words which are modified in synchronism and in the same way by the microcontrollers contained, respectively, in the coder and in the decoder.

In addition, although, in the example described, the coder 13 and the decoder 18 are installed, respectively, in the relay R2 and in the relay R1, it can be envisaged disposing the coder in the remote control TC and the decoder in the source SAV.

In addition, although the invention has been described with regard to an interconnection assembly for establishing a bi-directional communication between two devices 4 and 8 comprising television receivers TV1 and TV2, the invention is also applicable to purely audio devices, such as, for example, hi-fi units.

Finally, although the invention has been described with regard to audio and/or video devices using an infrared remote control, the invention is also applicable to audio and/or video devices using any other type of remote control emitting remote-control signals unable to pass through the walls or partitions of a building, or passing through them with difficulty.

The invention claimed is:

1. An interconnection method for establishing a bi-directional communication between two audio and/or video devices situated in different rooms in a building, a first of the two audio and/or video devices including a source of audio and/or video electrical signals controllable by a remote-control signal, the second of the two audio and/or video devices comprising a receiver and a remote control of the type generating a remote-control signal unable to pass through the walls or partitions of a building, said method comprising the steps of:

a) picking up, on the second audio and/or video device side, a remote-control signal emitted by the remote control and retransmitting, by radio link, remote-control information contained in the remote-control signal picked up;

b) receiving, on the first audio and/or video device side, the remote-control information retransmitted by radio link, resending said remote-control information in the form of said remote-control signal to the audio and/or video signal source in order to control the functioning of the latter, and sending, by radio link, audio and/or video signals delivered by said audio and/or video signal source in response to the remote-control signal; and c) receiving, on the second audio and/or video device side, the audio and/or video signals sent by radio link and delivering said audio and/or video signals thus received to the receiver of the second audio and/or video device;

characterized in that the method further comprises the steps of;

d) inserting, on the second audio and/or video device side, a code in the remote-control information sent by the remote control, so as to transmit coded remote-control information to the first audio and/or video device; and e) decoding, on the first audio and/or video device side, decoding the coded remote-control information received, comparing the code contained in the coded remote-control information received with a reference code, and rejecting the decoded remote-control information in the event of non-agreement between the two codes, wherein the remote-control information emitted by the remote control consists of an information bit frame, and wherein the coding is effected by replacing a start of each information bit in the frame with a code word composed of several code bits having, in total, a duration shorter than that of an information bit in the frame.

2. The method as claimed in claim 1, characterized in that use is made, as a code word for coding on the second audio and/or video device side and as a reference code word for comparing on the first audio and/or video device side, a code word comprising a fixed part having at least one code bit, forming a first bit of the code word and having the binary value "1" for serving as a synchronization bit during the decoding step on the first audio and/or video device side, and a part in which the code bits have values which can be selected by a user.

3. The method as claimed in claim 1, characterized in that, in the event of non-agreement between the two codes, the step of rejecting the decoded remote-control information consists of sending a remote-control signal having a content incomprehensible to the audio and/or video signal source.

4. The method as claimed in claim 1, characterized in that, in the event of non-agreement between the two code, the step of rejecting the decoded remote-control information consists of sending no remote-control signal to the audio and/or video signal source.

5. A wireless interconnection assembly for establishing a bi-directional communication between two audio and/or video devices situated in different rooms in a building, a first of the two audio and/or video devices including an audio and/or video electrical signal source controllable by a remote-control signal, the second of the two audio and/or video devices comprising a receiver and a remote control of a type generating a remote-control signal unable to pass through the walls or partitions of a building, said interconnection assembly comprising a first and second relay connectable, by cables, respectively, to the audio and/or video signal source of the first audio and/or video device and to the receiver of the second audio and/or video device, the second relay having a first receiving means for receiving remote-control information issuing from the remote control and a first sending means for retransmitting said remote-control information, by radio link, to the first relay, said first relay having a second receiving means for receiving the remote-control information retransmitted by the second relay, a second sending means for sending said remote-control information, in the form of said remote-control signal, to the audio and/or video signal source in order to control the functioning thereof, and a third sending means for sending, by radio link, audio and/or video signals delivered by the audio and/or video signal source in response to the remote-control signal, the second relay also having a third receiving means for receiving the audio and/or video signals sent by the third sending means of the first relay and for sending the received audio and/or video signals, by the corresponding cable, to the receiver of the second audio and/or video device, characterized in that said interconnection assembly also comprises, on the second audio and/or video device side, a coder for inserting a code in the remote-control information and, on the first audio and/or video device side, a decoder for decoding the coded remote-control information received, comparing the code contained in the coded remote-control information received with a reference code stored in the decoder, and rejecting the decoded remote-control information in the event of non-agreement between the two codes, wherein the remote-control information emitted by the remote control consists of an information bit frame, and wherein the coder inserts said code in said remote-control information by replacing a start of each information bit in the frame with a code word composed of several code bits having, in total, a duration shorter than that of an information bit in the frame.

6. The interconnection assembly as claimed in claim 5, characterized in that the coder is disposed in the second relay between the first receiving means and the first sending means, and the decoder is disposed in the first relay between the second receiving means and the second sending means.

7. A wireless interconnection assembly for establishing a bi-directional communication between two audio and/or video devices situated in different rooms in a building, a first of the two audio and/or video devices including an audio and/or video electrical signal source controllable by a remote-control signal, the second of the two audio and/or video devices comprising a receiver and a remote control of a type generating a remote-control signal unable to pass through the walls or partitions of a building, said interconnection assembly comprising a first and second relay connectable, by cables, respectively, to the audio and/or video signal source of the first audio and/or video device and to the receiver of the second audio and/or video device, the second relay having a first receiving means for receiving remote-control information issuing from the remote control and a first sending means for retransmitting said remote-control information, by radio link, to the first relay, said first relay having a second receiving means for receiving the remote-control information retransmitted by the second relay, a second sending means for sending said remote-control information, in the form of said remote-control signal, to the audio and/or video signal source in order to control the functioning thereof, and a third sending means for sending, by radio link, audio and/or video signals delivered by the audio and/or video signal source in response to the remote-control signal, the second relay also having a third receiving means for receiving the audio and/or video signals sent by the third sending means of the first relay and for sending the received audio and/or video signals, by the corresponding cable, to the receiver of the second audio and/or video device, characterized in that said interconnection assembly also comprises, on the second audio and/or video device side, a coder for inserting a code in the remote-control information and, on the first audio and/or video device side, a decoder for decoding the coded remote-control information received, comparing the code contained in the coded remote-control information received with a reference code stored in the decoder, and rejecting the decoded remote-control information in the event of non-agreement between the two codes, wherein the coder is disposed in the second relay between the first receiving means and the first sending means, and the decoder is disposed in the first relay between the second receiving means and the second sending means, wherein the remote-control information consists of an information bit frame, and wherein the coder has a first code memory containing a code word composed of several code bits having together a duration shorter than that of any information bit in said frame, and means for inserting said code word at the start of each information bit in the information bit frame coming from the first receiving means, and for delivering a coded frame to the first sending means.

8. The interconnection assembly as claimed in claim 7, characterized in that the code word is composed of two parts, said two parts including a fixed part having at least one code bit forming the first bit of the code word and having the binary value "1" for serving as a synchronization bit during the decoding in the decoder, and a part in which the code bits have values selectable by a user.

9. The interconnection assembly as claimed in claim 8, characterized in that the decoder has a second code memory containing a reference code word identical to the code word contained in the first code memory of the coder, a monostable circuit triggerable in response to the arrival of each information bit in the coded frame, said monostable circuit delivering a pulse with a duration longer than that of any information bit in said coded frame, comparison and decoding means for comparing, in response to the pulse delivered by the monostable circuit, the code word carried by the information bit which triggered the monostable circuit, with the reference code word contained in the second code memory, and for allowing, in the event of agreement between the two code words, the information bit to pass, in decoded form, to the second sending means, and for delivering a reset pulse at the end of said information bit for resetting said monostable circuit for setting the monostable circuit to wait for the following information bit in the coded frame, said comparison and decoding means, in the event of non-agreement between the two code words, delivering at least one reset pulse before the end of the information bit.

10. The interconnection assembly as claimed in claim 9, characterized in that the second sending means has an infrared light emitter, an electronic switch for connecting one of the terminals of the infrared light emitter to a reference potential point, said electronic switch being controlled by the decoded information bits coming from the decoder, an oscillator for generating a modulation carrier for application to another terminal of the infrared light emitter, and a shaping monostable circuit triggered by each reset pulse delivered by the comparison and decoding means of the decoder, said shaping monostable circuit controlling said oscillator.

11. A remote-control signal comprising a frame of information bits for controlling a function in an audio and/or video signal source, characterized in that said remote control signal contains a code word for identifying the remote control from which the remote-control signal came, characterized in that the code word is composed of several code bits having together a duration shorter than that of any information hit in said frame, said code word being inserted at the start of each information bit in said frame.

* * * * *